United States Patent
Behl et al.

[11] Patent Number: 5,494,763
[45] Date of Patent: Feb. 27, 1996

[54] ELECTROCHEMICAL CELL

[75] Inventors: Wishvender K. Behl, Ocean; Edward J. Plichta, Howell, both of N.J.

[73] Assignee: The United States of America as represented by the Secretary of the Army, Washington, D.C.

[21] Appl. No.: 448,949

[22] Filed: May 24, 1995

[51] Int. Cl.$^6$ .......................... H01M 4/24; H01M 4/32; H01M 4/34

[52] U.S. Cl. .......................... 429/206; 429/218; 429/219; 429/220; 429/223; 429/224; 429/225; 429/226

[58] Field of Search .................... 429/218, 219, 429/220, 223, 224, 225, 226, 206

[56] References Cited

U.S. PATENT DOCUMENTS

| | | | |
|---|---|---|---|
| 4,756,981 | 7/1988 | Breault et al. | 429/36 |
| 4,952,465 | 8/1990 | Harris et al. | 429/60 |
| 5,366,828 | 11/1994 | Struthers | 429/101 |

*Primary Examiner*—Stephen Kalafut
*Assistant Examiner*—Richard H. Lilley, Jr.
*Attorney, Agent, or Firm*—Michael Zelenka; William H. Anderson; Roy E. Gordon

[57] ABSTRACT

An improved electrochemical cell is provided using a high surface area carbon electrodes as the negative electrode in an alkali metal hydroxide electrolyte.

10 Claims, 1 Drawing Sheet

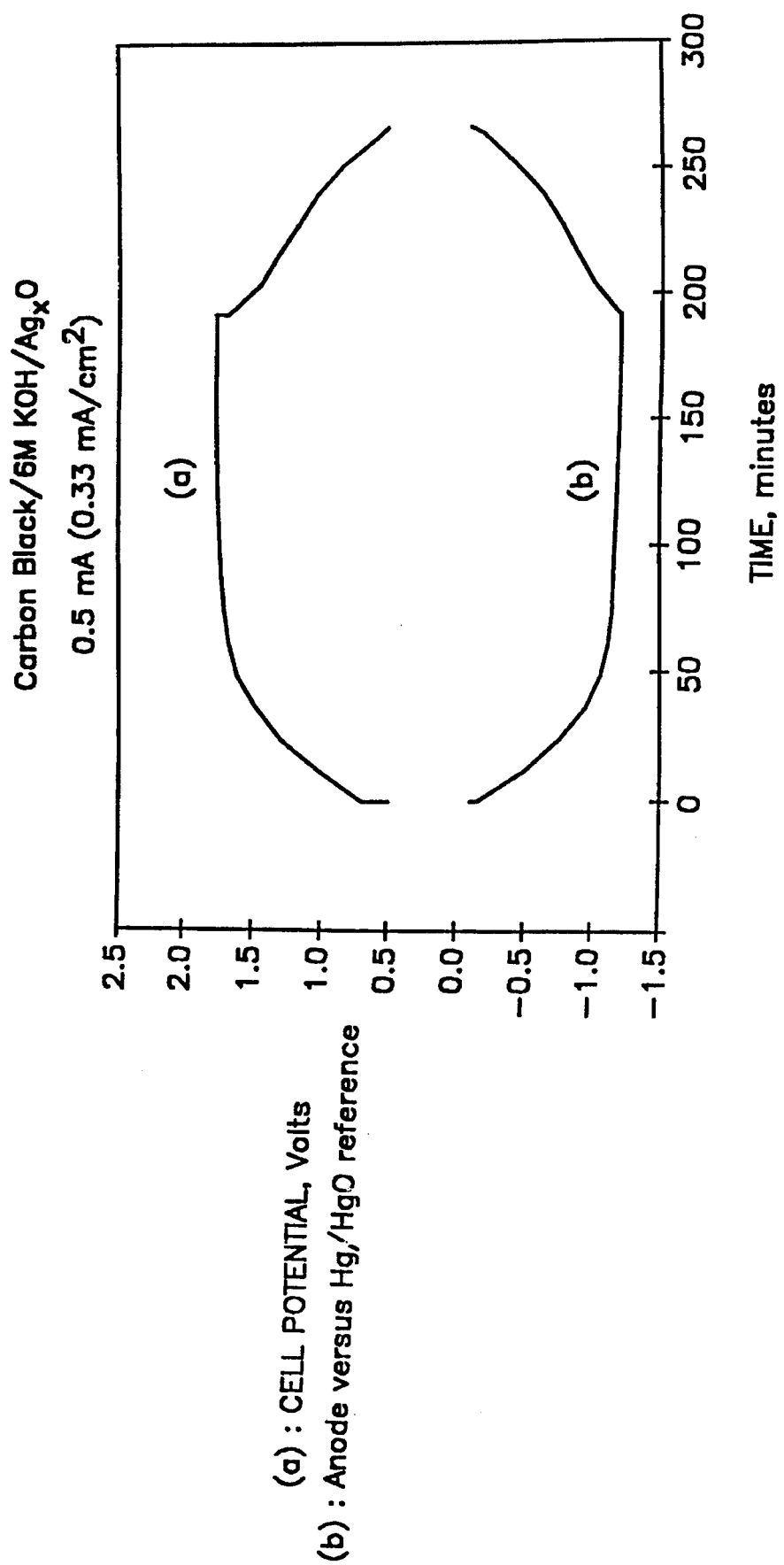

ELECTROCHEMICAL CELL

GOVERNMENT INTEREST

The invention described herein may be manufactured, used, and licensed by or for the Government for governmental purposes without the payment to us of any royalties thereon.

FIELD OF INVENTION

The invention relates in general to an ambient temperature electrochemical cell and in particular to such an electrochemical cell that uses a high surface area carbon electrode as the negative electrode in an alkali metal hydroxide electrolyte.

BACKGROUND OF THE INVENTION

There has been a need for some type of inexpensive power source such as an electrochemical cell that can be used for communication devices. Especially desirable is an inexpensive ambient temperature electrochemical cell that uses a high surface area carbon electrode as the negative electrode in an alkali metal hydroxide electrolyte.

SUMMARY OF THE INVENTION

The general object of this invention is to provide an ambient temperature, inexpensive electrochemical cell that uses high surface area carbon as the negative electrode in an alkali metal hydroxide electrolyte.

It has now been found that the aforementioned objects can be attained by providing an electrochemical cell that uses a high surface area carbon as one of the electrodes and utilizes the double layer charge stored on these electrodes.

DESCRIPTION OF THE PREFERRED EMBODIMENT

The high surface area carbon electrode is made by mixing 80 weight percent Black Pearl 2000, a high surface area carbon with a surface area of 1475 $m^2$ gm manufactured by Cabot Corp. of Boston, Mass. with 20 weight percent of PTFE Teflon-60 aqueous emulsion manufactured by Dupont Corp. of Wilmington, Del. The mixture is roll milled into a coherent stiff dough and spread on an expanded nickel screen (Exmet) with a geometric area of 1.5 $cm^2$. The amount of the carbon loading in the electrode is 0.0087 gm. The cathode includes sintered silver on a 2 $cm^2$ expanded silver screen and the amount of silver loading in the electrode is 0.637 gm. The electrolyte includes a 6 molar solution of potassium hydroxide and is contained in a glass vessel fitted with standard glass joints for introducing the electrodes. The silver electrode is precharged in the potassium hydroxide electrolyte to form silver oxide ($Ag_2O$) using a carbon rod as the negative electrode. The carbon rod is then removed and the high surface area carbon anode immersed in the electrolyte so that the electrode separation is about 3 cm. An Hg/HgO electrode is also introduced in the solution to serve as a reference electrode.

DESCRIPTION OF THE DRAWING AND THE PREFERRED EMBODIMENTS

FIG. 1, curve (a) shows a charge—discharge curve of the cell obtained for the 10th cycle.

FIG. 1, (curve (b) shows the potential of the high surface area carbon electrode versus the Hg/HgO reference electrode during the charge-discharge cycle of the cell.

Referring to curve (a) the cell is charged and discharged at a current density of 0.33 $mA/cm^2$ and cycled between the voltage limits of 0.5 V to 1.77 V.

Referring to curve (b), upon charge, $Ag_2O$ is oxidized to AgO at the positive electrode while the double layer of the high surface area carbon electrode is charged at the negative electrode. The carbon electrode potential versus the Hg/HgO reference decreases to about $-1.2$ V towards the end of the charge cycle when some hydrogen evolution is observed. Upon discharge, the electrode processes at the two electrodes are reversed. It is found that the cell exhibits a Coulombic efficiency of only 40 percent between the charge and discharge cycle. The charge recovered on discharge is found to be 73 mAh/gm of carbon compared to the double layer capacity of 82 mAh/gm calculated for the Black Pearl 2000 carbon with a surface area of 1475 $m^2$ gm. Thus, charge stored on the carbon black electrode may be entirely attributed to the double layer capacity of the carbon electrode.

Other high surface area carbons that can be used in the invention include Shawinigan Black, Petroleum Coke and Furnace Carbon blacks. By high surface area carbons are meant carbons having a surface area of about 30 to 1500 $m^2$ gm.

Other cathodes that can be used in the invention include metal oxides that are more positive in potential than the anode such as lead dioxide, nickel oxyhydroxide, cobalt oxyhydroxide, mercuric oxide, manganese oxide and copper oxide.

We wish it to be understood that we do not desire to be limited to the exact details of construction shown and described for obvious modifications will occur to a person skilled in the art.

What is claimed is:

1. An electrochemical cell including a high surface area carbon as the anode, a metal oxide as the cathode, and an alkali metal hydroxide as the electrolyte.

2. An electrochemical cell according to claim 1 wherein the alkali metal hydroxide is selected from the group of metal hydroxides consisting of sodium hydroxide and potassium hydroxide.

3. An electrochemical cell including a carbon having a surface area of about 1475 $m_2$/gm as the anode, silver oxide as the cathode, and potassium hydroxide as the electrolyte.

4. An electrochemical cell according to claim 1 wherein the metal oxide is lead dioxide.

5. An electrochemical cell according to claim 1 wherein the metal oxide is cobalt oxyhydroxide.

6. An electrochemical cell according to claim 1 wherein the metal oxide is mercuric oxide.

7. An electrochemical cell according to claim 1 wherein the metal oxide is manganese dioxide.

8. An electrochemical cell according to claim 1 wherein the metal oxide is copper oxide.

9. An electrochemical cell according to claim 1 wherein the metal hydroxide is sodium hydroxide.

10. An electrochemical cell according to claim 1 wherein the alkali metal hydroxide is potassium hydroxide.

* * * * *